(No Model.) 2 Sheets—Sheet 1.

A. D. ORDWAY.
OVEN.

No. 513,821. Patented Jan. 30, 1894.

WITNESSES. Henry Marsh. W. S. McLeod.

INVENTOR. A. D. Ordway by Wight, Brown & Crossley attys.

THE NATIONAL LITHOGRAPHING COMPANY, WASHINGTON, D. C.

(No Model.) 2 Sheets—Sheet 2.

A. D. ORDWAY.
OVEN.

No. 513,821. Patented Jan. 30, 1894.

Witnesses.
Henry Marsh.
W. S. McLeod.

Inventor,
A. D. Ordway.
by
Wright, Brown & Cowdrey.
Attys.

UNITED STATES PATENT OFFICE.

ARTHUR DANA ORDWAY, OF NEWBURYPORT, MASSACHUSETTS.

OVEN.

SPECIFICATION forming part of Letters Patent No. 513,821, dated January 30, 1894.

Application filed November 19, 1892. Serial No. 452,564. (No model.)

*To all whom it may concern:*

Be it known that I, ARTHUR DANA ORDWAY, of Newburyport, in the county of Essex and State of Massachusetts, have invented certain new and useful Improvements in Ovens, of which the following is a specification.

This invention has relation to ovens generally whether portable or stationary; and it has for its object to provide improvements whereby the heat from the fire may be directed to either or all of several baking compartments, or to the cooking range, and also be prevented from wasting by radiation.

To these ends, the invention consists in the construction, as hereinafter described and claimed.

Reference is to be had to the annexed drawings and to the letters of reference marked thereon, forming a part of this specification, the same letters designating the same parts or features, as the case may be, wherever they occur.

Figure 1:
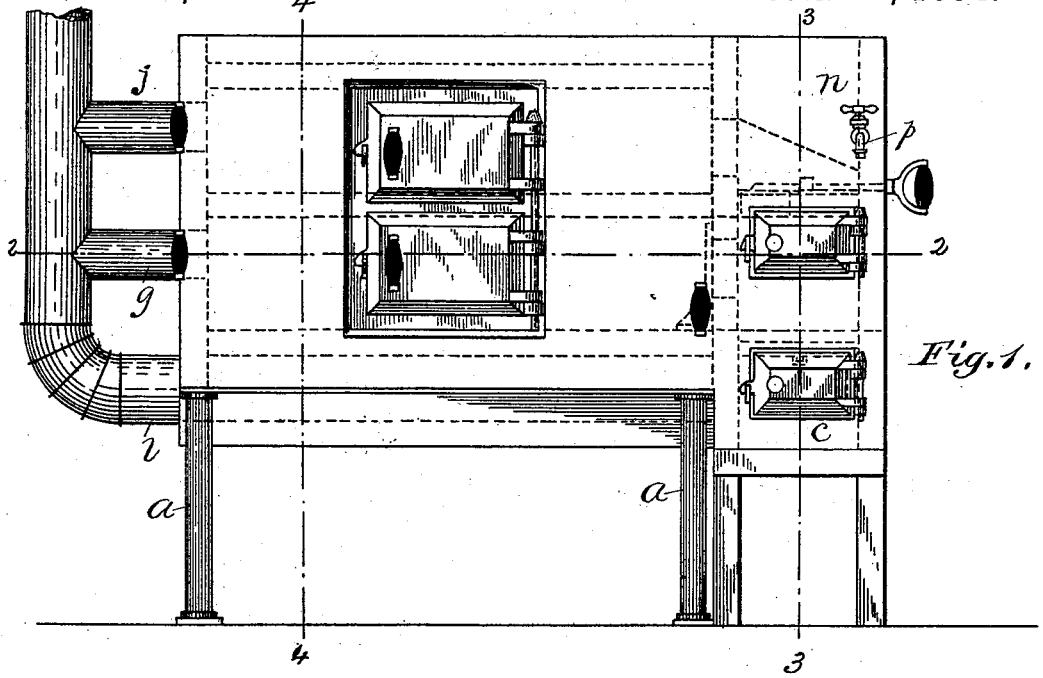
Figure 2:
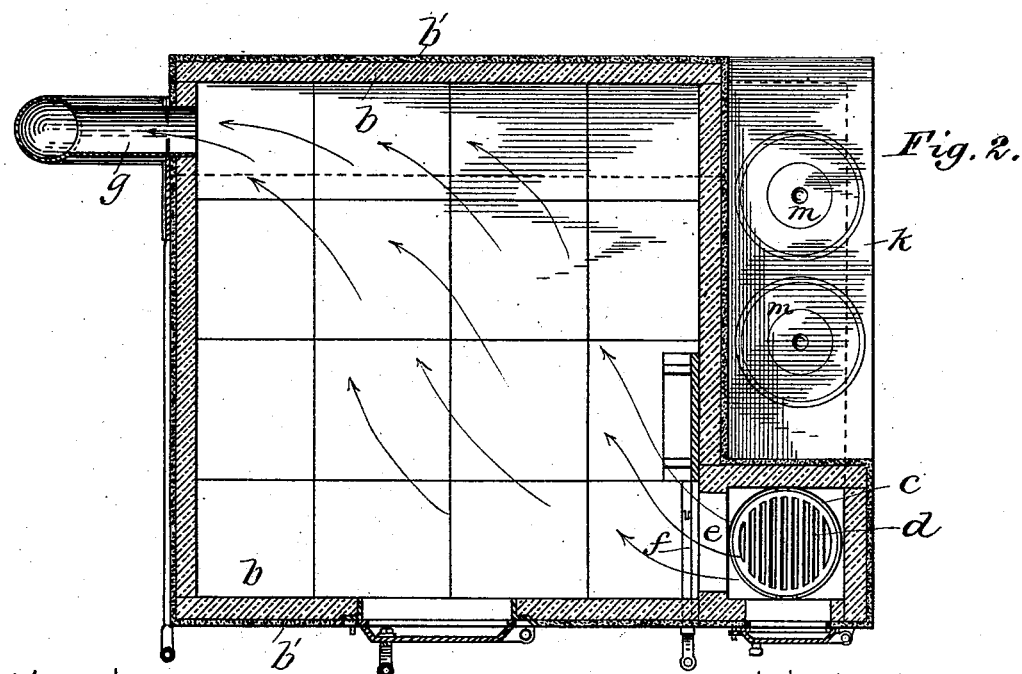
Figure 3:
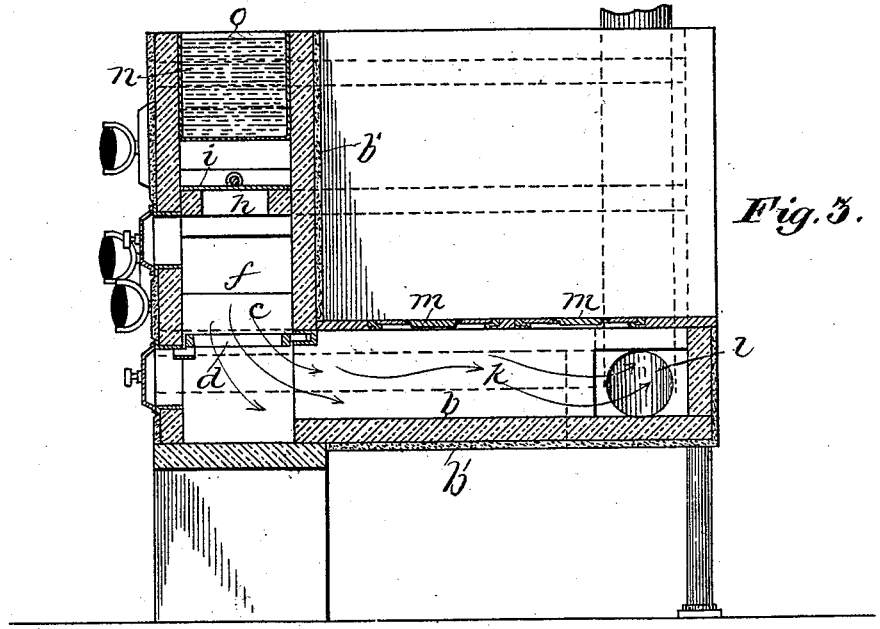
Figure 4:
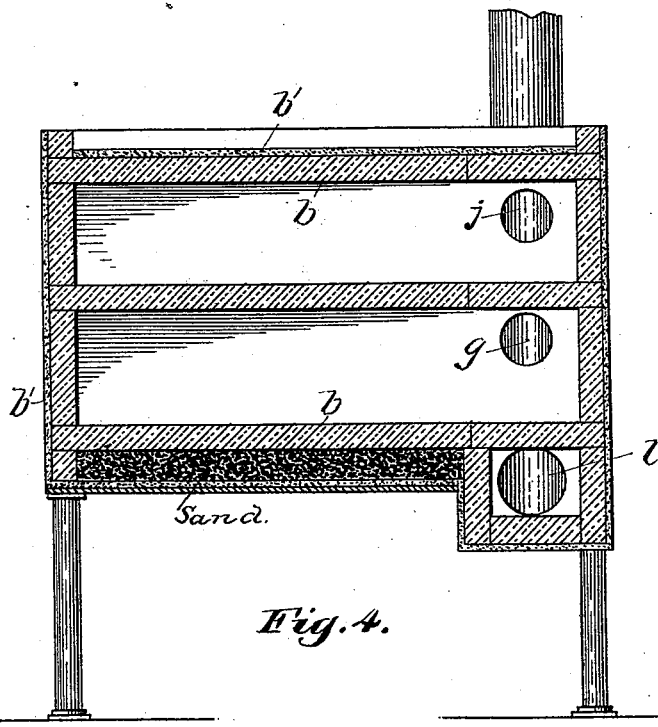

Of the drawings—Figure 1, is a front elevation of my improved oven. Fig. 2, is a horizontal sectional view of the same, taken on the line 2, 2, of Fig. 1. Fig. 3, is a vertical sectional view taken on the line 3, 3, of Fig. 1. Fig. 4, is a vertical sectional view taken on the line 4, 4, Fig. 1.

In the drawings $a$ designates the base of the oven which may be made in any way and of any material suiting it to support the essential parts of the contrivance.

The body of the oven is composed of tiles $b$ or their equivalent, covered or coated with magnesia $b'$ or other substance which is a non conductor of heat. This provision is made in order that the heat supplied to the oven may be conserved therein in order that it may be employed in baking effects and not be wasted by radiation to the discomfort of the attendant and others about the oven. This covering or coating of magnesia or its equivalent, as shown in the drawings, is applied directly to the outer face of the tiles $b$, and secured thereto without an external casing. Thus the coating or covering $b'$ forms the external face of the oven.

Ovens have been heretofore made composed of tiles and an outer metallic casing with some non-conducting material inserted in the space between. In such constructions there are always some metallic connections which will serve to conduct more or less heat to the outer metallic casing, while by my invention no part of the outer face of the oven is composed of metal so as to radiate heat.

In the present instance the oven is shown as composed of two compartments, one above the other, but it may consist of more compartments or be confined to one.

$c$ is the fire pot or heater, connected with the oven but arranged outside of, and preferably at one corner of the same, as shown. Above the grate $d$ there is a flue $e$ controlled by a damper $f$ leading to the lower baking compartment, and from the opposite farthest corner from the fire pot there is a damper controlled flue $g$ leading from the said lower compartment. Over the grate and above the flue $e$ there is a flue $h$ controlled by the damper $i$. Leading to the upper compartment from the opposite farthest corner is a damper controlled flue $j$ leading to the exterior. With this arrangement of fire pot, flues, and dampers, the heat can be directed to either or both of the chambers, or shut off from either or both, and when the fire is being stirred or renewed the compartments in which material may be in process of baking can be shut off from dust and cinders. By arranging the fire pot or heater in one corner outside of the oven, and the flues from the oven in the farthest opposite corner, the greatest area of baking space is provided and the heat is distributed quite evenly throughout the oven.

$k$ designates a range or other cooking contrivance connected with the oven, though outside of the same, on a plane, as shown in the present instance, below the grate $d$ from which a flue $l$ leads to the exterior, so that in case the draft is shut off from the fire above the grate, by a down-draft, as indicated by the arrows in Fig. 3, the range or cooker $k$ may be heated.

The range $k$ may be furnished with a grate for a fire located below the grate $d$ or below the covers $m$ $m$ or at other convenient point, so that a fire may be maintained thereon, independent of the fire for heating the oven chambers, in order that the range may be employed independent of the oven, without affecting the latter.

$m$ $m$ designate covers for holes in the top of the range in which holes pots or other cooking utensils may be placed when needed.

$n$ is a boiler or water-heater arranged over the fire pot, for heating water in order that the same may be at hand when needed. A cover $o$ for the top of the boiler $n$ affords a means for filling the same, and a cock or spigot $p$ communicating with the said boiler provides a way whereby the water can be drawn off.

It is to be noted that the baking chambers, fire pot, range, and water heater, are connected, though made independent, each of the other, and all are inclosed in a single coating or covering of magnesia, or its equivalent.

The range or cooking contrivance $k$ may be arranged in a plane on a line with the fire pot or on a plane above the same, but in the position shown it is convenient to be used, and when used the heat employed therein does no appreciably affect the heat in the other parts of the oven.

Having thus explained the nature of my invention and described a way of constructing and using the same, though without attempting to set forth all of the forms in which it may be made or all of its modes of use, I declare that what I claim is—

1. An oven comprising in its construction a fire pot or heater, a plurality of baking compartments, one above another, a range or cooking contrivance, and damper-controlled flues for directing the heat from the fire pot to either or all of the said compartments, or to the said range, as set forth.

2. An oven comprising in its construction, a fire pot or heater, a plurality of baking compartments one above another, a range or cooking contrivance, and damper controlled flues for directing the heat from the fire pot to either or all of the said compartments, or to the said range, the entire structure being inclosed within a covering of magnesia or its equivalent, as set forth.

In testimony whereof I have signed my name to this specification, in the presence of two subscribing witnesses, this 5th day of November, A. D. 1892.

ARTHUR DANA ORDWAY.

Witnesses:
ARTHUR W. CROSSLEY,
WALTER S. McLEOD.